Oct. 2, 1928.  
P. A. CIROU  
1,685,907  
DEVICE FOR ELEVATING WATER  
Filed March 24, 1927  2 Sheets-Sheet 1

Witnesses:  
Gentizon Robert  
Alfred Wild

Inventor:  
Paul Arsène Cirou  
per Fred. F. Barlow  
Attorney

Oct. 2, 1928.                                                            1,685,907
P. A. CIROU
DEVICE FOR ELEVATING WATER
Filed March 24, 1927                       2 Sheets-Sheet 2

Patented Oct. 2, 1928.

1,685,907

UNITED STATES PATENT OFFICE.

PAUL ARSÈNE CIROU, OF TLEMCEN, ALGERIA.

DEVICE FOR ELEVATING WATER.

Application filed March 24, 1927, Serial No. 177,964, and in France May 6, 1926.

My invention relates to improvements in water elevators in which an endless belt containing a series of buckets having double compartments is utilized both for elevating the water and keeping the device in motion.

I attain these results by the mechanism illustrated in the accompanying drawing, in which—

Similar numerals refer to similar parts throughout the several views.

Figure 4:
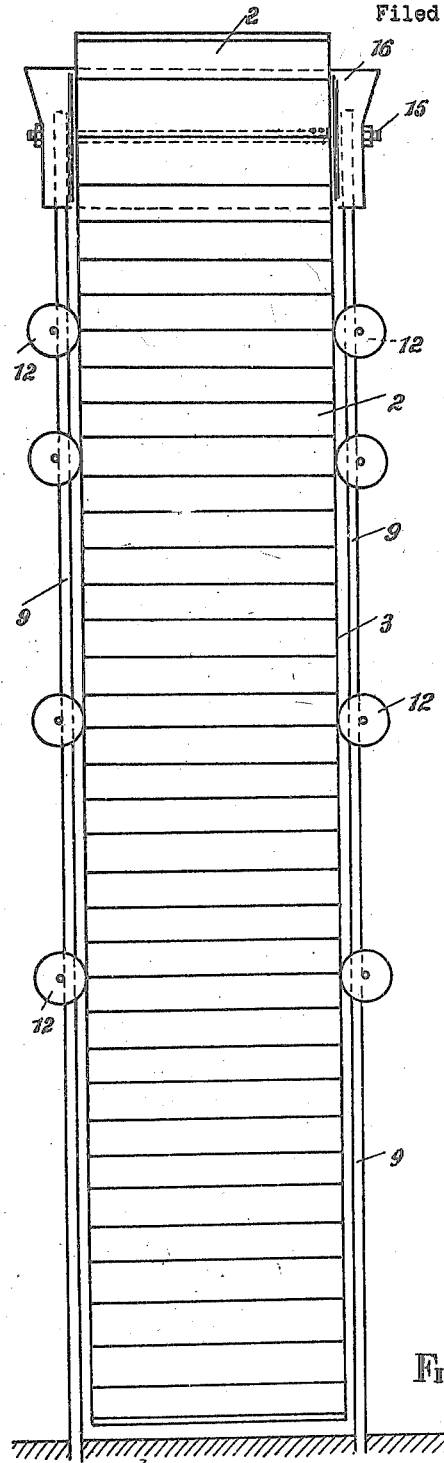
Fig. 4, is a similar view in front elevation.

Referring to the drawing, 1 represents what I term an elevating bucket constructed after the principle of my invention and 2 one of the driving buckets. Said buckets are mounted on an endless belt or chain 3 in such a manner that every third bucket is an elevating bucket, the remaining buckets being driving buckets.

Figure 3:
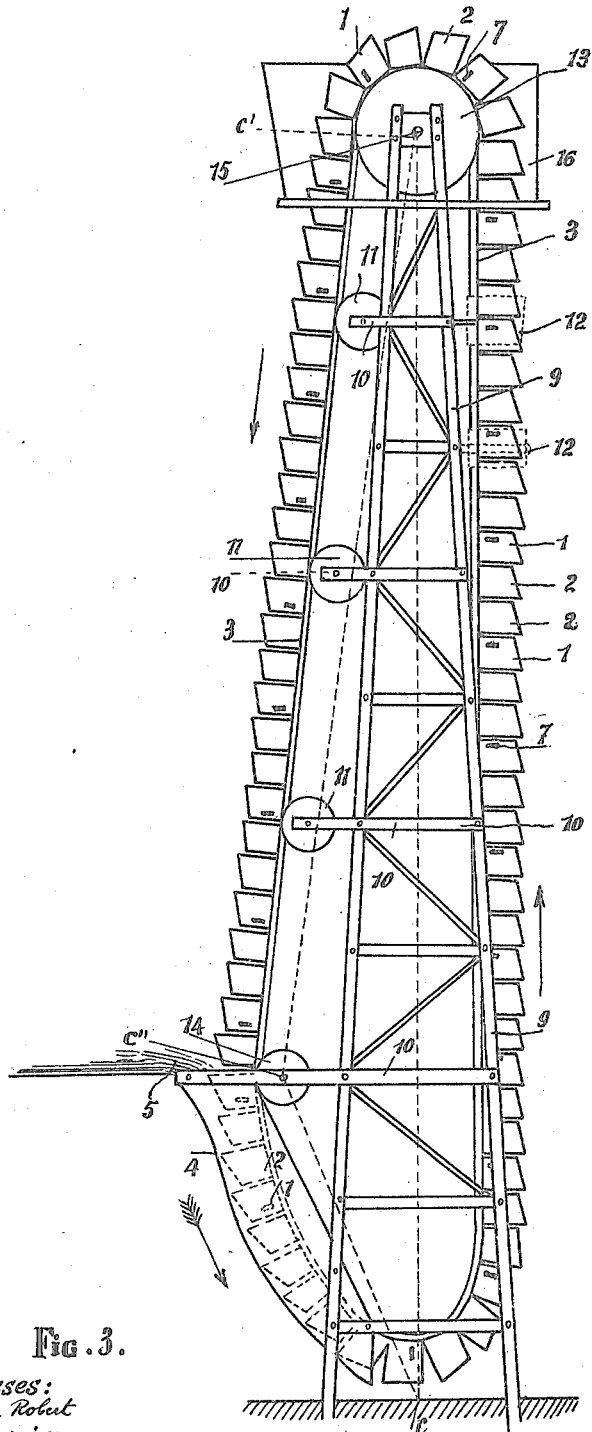
Fig. 3, is a side elevational view of the complete device.

Belt 3 is supported by a triangular frame represented diagrammatically by the triangle $c$, $c'$, $c''$, shown dotted in Fig. 3. Along the side $c$, $c''$ of this frame the buckets are covered by a casing 4 to facilitate the rapid filling of the buckets. The water 5 which is to be elevated is arranged to flow into casing 4.

Figure 1:
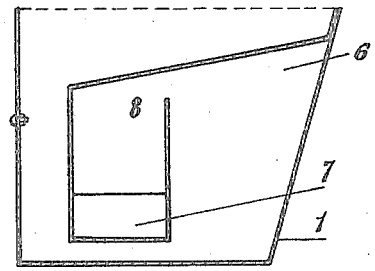
Fig. 1, is a sectional view of one of the buckets.

Referring to Fig. 1, the driving buckets consist of an exterior cupped-shaped member having an inclined front wall with compartments 8 and 6 respectively. Compartment 8 is provided with a discharging orifice 7 at its lower extremity. This discharging orifice may be made adjustable if desired.

Figure 2:
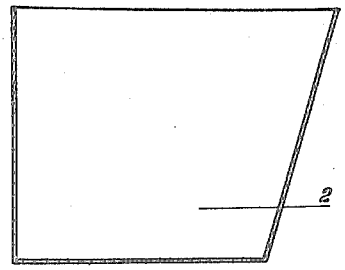
Fig. 2, is a sectional view of one of the intermediary buckets.

The driving buckets 2 (Fig. 2) are similar to buckets 1 exteriorly but contain but one compartment on their interior.

The whole device is supported and braced by a truss 9. The chain 3, above mentioned, slides on rollers 11 and 14 supported by horizontal arms 10 fastened to truss 9, passes over a large pulley 13 at the top of the device and is guided down the other side of truss 9 by means of additional pulleys 12 engaging the belt. Pulley 13 is journaled to the truss by means of a shaft 15. A receptacle 16 for catching the elevated water is provided at the upper extremity of the device.

The operation of my device is as follows:

The water 5 to be elevated is led to casing 4 and fills the buckets therein. This sets the device in motion. When buckets 2 reach the bottom their contents are completely discharged. When a bucket 1 reaches the casing, however, it is in the position illustrated in Fig. 1. The exterior casing is filled and the bucket descends. Upon arriving at the bottom the bucket discharges only a portion of its contents, the other portion being retained in compartments 6 and 8 up to the orifice 7 in the latter. The bucket continues to travel upward and upon reaching the top is again reversed and its position restored to that shown in Fig. 1. During this reversing operation, however, the contents of the bucket are discharged through orifice 7 into the receptacle 16.

It is to be understood that the device will function without the buckets 2. Two types of buckets have been disclosed, however, and have for a purpose the regulation of the speed at which the device is driven which of course is dependent upon the quantity of flow. By varying the number and kind of bucket used the device may be regulated to suit substantially any condition which may present itself.

My device is particularly adapted for irrigating purposes, for creating artificial water heads to be subsequently used for power and may be advantageously utilized in any situation where water is to be elevated under its own power.

Having described my invention to allow those skilled in the art to make and use the same, what I claim is:

1. A device for elevating water comprising an endless belt, a plurality of buckets mounted on said belt, a casing surrounding a portion of said belt and adapted to fill said buckets when in the upright position and means in certain of said buckets for retaining a portion of their contents when inverted by said belt.

2. A device for elevating water comprising an endless belt, a plurality of buckets mounted on said belt, a casing surrounding a portion of said belt and adapted to fill said buckets when in the upright position, means in said buckets for retaining a portion of their contents when inverted by said belt and means for discharging the retained contents automatically when the buckets are subsequently reinverted by said belt.

3. In a device of the type described, a frame, a plurality of guiding pulleys mounted on said frame, an endless belt mounted to revolve above and between certain of said pulleys, a plurality of buckets mounted on said belt, a casing surrounding a portion of said belt and adapted to fill said buckets when in the upright position, means in some of said buckets for retaining a portion of their contents and subsequently discharging said contents when inverted and reinverted by said belt and means at the upper extremity of said belt for catching the discharged contents.

4. In a device of the class described an endless vertically extending belt, a plurality of fluid actuated buckets mounted on said belt, means in said buckets for elevating a portion of the fluid actuating said device and means including a plurality of non-elevating buckets for regulating the speed of said belt in accordance with the rate of flow of the fluid supplied to said device.

5. An elevating bucket comprising a rectangular outer casing having an inclined wall, a second casing mounted on said inclined wall on the interior of said outer casing being open at the bottom, a third casing mounted in said second casing having its open top facing the bottom of said second casing and an orifice in the bottom of said third casing whereby a fluid entering said bucket is partially retained and subsequently discharged upon inversion and reinversion of said elevating bucket.

PAUL ARSÈNE CIROU.